(12) United States Patent
Oroskar et al.

(10) Patent No.: US 9,560,660 B1
(45) Date of Patent: Jan. 31, 2017

(54) METHOD AND SYSTEM OF MANAGING AN ALLOCATION OF RESOURCES (71) Applicant: Sprint Spectrum L.P., Overland Park, KS (US)

(72) Inventors: Siddarth S. Oroskar, Overland Park, KS (US); Jasinder P. Singh, Olathe, KS (US); Maulik K. Shah, Austin, TX (US)

(73) Assignee: Sprint Spectrum L.P., Overland Park, KS (US)

( * ) Notice: Subject to any disclaimer, the term of this patent is extended or adjusted under 35 U.S.C. 154(b) by 147 days.

(21) Appl. No.: 14/497,121

(22) Filed: Sep. 25, 2014

(51) Int. Cl.
*H04W 4/00* (2009.01)
*H04W 72/04* (2009.01)

(52) U.S. Cl.
CPC .............................. *H04W 72/0493* (2013.01)

(58) Field of Classification Search
None
See application file for complete search history.

(56) References Cited

U.S. PATENT DOCUMENTS

| 2011/0292895 | A1* | 12/2011 | Wager | H04L 5/0007 370/329 |
| 2013/0003583 | A1* | 1/2013 | Landstrom | H04B 7/0452 370/252 |
| 2013/0155966 | A1* | 6/2013 | Bekiares | H04W 28/16 370/329 |
| 2014/0073342 | A1* | 3/2014 | Lioulis | H04W 64/00 455/452.2 |

* cited by examiner

Primary Examiner — Willie J Daniel, Jr.

(57) ABSTRACT

Disclosed is a method and system of managing an allocation of resources in a wireless communication system. According to the disclosure, a base station may receive or otherwise determine an indication of radio frequency (RF) conditions being perceived by a given user equipment device (UE). Based on that indication, the base station may make a decision of whether to use a first resource limitation or a second resource limitation for data transmissions to the given UE, where the second resource limitation generally allows for a lesser extent of resources to be allocated than the first resource limitation in weaker RF conditions. For instance, the base station may decide to use a bit-rate limitation for threshold strong RF conditions and a resource-block limitation for threshold weak RF conditions. Thereafter, the base station may allocate resources for a data transmission to the given UE in accordance with the decision.

13 Claims, 5 Drawing Sheets

METHOD AND SYSTEM OF MANAGING AN ALLOCATION OF RESOURCES

BACKGROUND

Unless otherwise indicated herein, the description provided in this section is not prior art to the claims and is not admitted to be prior art by inclusion in this section.

A typical cellular wireless network includes a number of base stations that radiate to define wireless coverage areas, such as cells and cell sectors, in which user equipment devices (UEs) can operate and engage in air-interface communication with the cellular wireless network. Each base station may then be coupled with network infrastructure that provides connectivity with one or more transport networks, such as the public switched telephone network (PSTN) and/or the Internet for instance. Within this arrangement, a UE operating in a coverage area of the cellular wireless network can engage in communication, via the cellular wireless network, with remote network entities or with other UEs operating in the cellular wireless network.

The cellular wireless network may operate in accordance with a particular air-interface protocol or "radio access technology," examples of which include Orthogonal Frequency Division Multiple Access (OFDMA) (e.g., Long Term Evolution (LTE) or Wireless Interoperability for Microwave Access (WiMAX)), Code Division Multiple Access (CDMA) (e.g., 1×RTT and 1×EV-DO), and Global System for Mobile Communications (GSM), among others. Generally, the agreed air-interface protocol may define a downlink (or forward link) for carrying communications from the base stations to UEs and an uplink (or reverse link) for carrying communications from UEs to the base stations. Further, the agreed air-interface protocol may employ techniques such time-division multiplexing, frequency-division multiplexing, and/or code-division multiplexing to divide the downlink and uplink into discrete air-interface resources that are then used to carry control and/or bearer data between the base station and particular UEs.

In an OFDMA protocol such as LTE, for instance, the downlink may operate on a given carrier frequency and span a particular channel bandwidth, such as 3 MHz, 5 MHz, 10 MHz, 15 MHz, or 20 MHz. In turn, the LTE protocol may divide the downlink in both the time and frequency domains into discrete "resource blocks" that may be allocated for data transmission to UEs. For instance, in the time domain, the LTE downlink may be divided into transmission time intervals (TTIs), or sub-frames, that each have a duration of 1 millisecond (ms) and consist of two 0.5 ms timeslots. And in the frequency domain, the LTE downlink may be divided into groups of 12 sub-carriers that each have a bandwidth of 15 KHz (for a total group bandwidth of 180 kHz), with each group of sub-carriers in a given timeslot defining a different resource block. Thus, in each TTI, the LTE downlink has a finite number of resource blocks that is limited by the downlink's channel bandwidth. An OFDMA uplink may then have a similar configuration.

The LTE protocol may also define various shared downlink channels that are mapped onto the downlink's resource blocks. For instance, LTE defines a Physical Downlink Shared Channel (PDSCH), which is typically the primary downlink channel for transmitting user data to UEs. In addition, LTE defines downlink control channels that carry various types of control signaling, such as a Physical Control Format Indicator Channel (PCFICH), a Physical Hybrid ARQ Indicator Channel (PHICH), and a Physical Downlink Control Channel (PDCCH).

OVERVIEW

In a system operating according to an OFDMA protocol such as LTE, base stations and/or associated equipment may employ a scheduler that functions to dynamically allocate the resource blocks for data transmission with UEs on an as needed basis. As part of this process, the scheduler may define various characteristics of a given data transmission with a UE, such as a modulation and coding scheme (MCS) and a quality of service (QoS) to be used for the data transmission.

In one example scheduler implementation, when an LTE base station has data intended for a particular UE, the base station may first select a MCS to be used for the data transmission to the UE, which generally comprises a combination of a particular modulation scheme (e.g., Quadrature Phase Shift Keying (QPSK), 16 Quadrature Amplitude Modulation (16QAM), or 64QAM) and a particular code rate. According to LTE, the base station may perform this selection based on one or more channel quality indicators (CQIs) received from the UE, which provide an indication of the radio frequency (RF) conditions being detected by the UE. For instance, if the last one or more CQIs received from the UE indicate relatively weak RF conditions, the base station may select a lower-order MCS that generally provides more reliable (but less efficient) transmissions. Or if the last one or more CQIs received from the UE indicate relatively strong RF conditions, the base station may select a higher-order MCS that generally provides more efficient (but potentially less reliable) transmissions.

The particular MCS selected by the base station then serves to define the amount of data that can be included in each resource block allocated to the UE, as each different MSC typically corresponds to a different level of bit-rate efficiency. For instance, if the base station selects a lower-order MCS, this generally corresponds to a lower amount of data per resource block. Or if the base station selects a higher-order MCS, this generally corresponds to a higher amount of data per resource block. As one representative example, in LTE, the amount of data per resource block may range from up to approximately 12 bits per resource block for the lowest-order MSC to up to approximately 444 bits per resource block for the highest-order MSC (assuming that each resource block has 80 resource elements that are modulated to carry user data).

After selecting the MCS (and the corresponding number of bits per resource block) for the data transmission, the base station may then identify any applicable bit-rate limitation for the data transmission to the UE. For instance, if the data transmission to the UE is part of a "best effort" communication occurring over a non-guaranteed bit rate (non-GBR) bearer, the base station may identify a maximum bit rate for the data transmission based on a downlink "aggregate maximum bit rate" (AMBR) value, which generally defines a maximum aggregate bit rate that a given UE is allowed to receive across all of the UE's non-GBR bearers. Or if the data transmission to the UE is part of a real-time communication occurring over a GBR bearer, the base station may identify both a maximum bit rate for the data transmission based on a downlink maximum bit rate (MBR) value, which generally defines the maximum bit rate that a given UE is allowed to receive on a GBR bearer, and a minimum bit rate for the data transmission based on a downlink GBR value, which generally defines the minimum bit rate that a given UE is allowed to receive on a GBR bearer.

Once an applicable bit-rate limitation has been identified, the base station may then apply that bit-rate limitation when allocating the resource blocks for the data transmission to the UE. For instance, if the base station identifies a maximum allowable bit rate that applies to the data transmission, the base station may then determine the number of resource blocks that would need to be allocated in a given TTI in order to achieve that maximum allowable bit rate. The base station may carry out this determination in various manners, but in general, the number of resource blocks will be calculated based on the maximum allowable bit rate, the number of bits that can be included in each resource block for the selected MCS, and the duration of the TTI. Finally, once the base station determines the number of resource blocks needed to achieve the maximum allowable bit rate for the data transmission, the base station may then attempt to allocate up to this number of resource blocks to the UE in the next available TTI.

It should be understood that when a UE has data for transmission to the LTE network on the LTE uplink, the base station's scheduler may also be configured to dynamically allocate uplink resource blocks for such a data transmission, and the base station may perform this allocation in a similar manner (e.g., according to a reported CQI and an uplink AMBR value).

Thus, based on the foregoing, it is apparent that when the base station uses a bit-rate limitation for a data transmission with a UE, the extent of resource blocks that the base station may allocate for that data transmission varies based on the RF conditions being detected by the UE. For instance, when a UE's reported CQI indicates relatively strong RF conditions and a higher-order MCS is selected for the data transmission—which can support a larger number of bits per resource block—the base station can achieve a desired bit rate by allocating a lesser extent of resource blocks. On the other hand, when a UE's reported CQI indicates relatively weak RF conditions and a lower-order MCS is selected for the data transmission—which can only support a lower number of bits per resource block—the base station will need to allocate a greater extent of resource blocks to achieve that same desired bit rate. As a result, this scheduler process may lead to a base station allocating a disproportionate share of resource blocks to UEs in weak RF conditions (e.g., UEs at the base station's cell edge), which may ultimately inhibit base station's ability to adequately serve UEs in strong RF conditions.

Disclosed herein are methods and systems to help address this issue. In accordance with the disclosure, a base station or other entity in a wireless communication system may receive or otherwise determine an indication of the RF conditions being perceived by a given UE (e.g., a CQI index). Based on the indicated RF conditions, the base station may make a decision of whether to use a first resource limitation or a second resource limitation for data transmissions with the UE, where the second resource limitation generally allows a lesser extent of resources to be allocated than the first resource limitation for weaker RF conditions. For instance, the base station may decide to use a bit-rate limitation (e.g., a Used UE-AMBR or MBR) if the indicated RF conditions are relatively strong (e.g., a CQI at or above 7) and to use a resource-block limitation if the determined RF conditions are relatively weak RF (e.g., a CQI below 7). Thereafter, the base station may allocate resources for a given data transmission with the UE in accordance with the decision.

A base station operating in accordance with the present disclosure may thus be capable of imposing a more stringent limitation on the extent of resource blocks allocated to UEs in weak RF conditions, which may prevent the base station from allocating a disproportionate share of resource blocks to these UEs and free up resource blocks for other UEs. This may then enable the base station to better serve UEs in stronger RF conditions (e.g., by increasing the likelihood of the base station providing these UEs with bit rates that are closer to the UEs' maximum allowable bit rates).

Accordingly, in one respect, disclosed is a method that involves a base station (a) making a decision, based at least in part on an indication of RF conditions being perceived by a given UE (e.g., a CQI index), of whether to use a first resource limitation or a second resource limitation for data transmissions to the given UE, and (b) thereafter allocating resources for a given data transmission to the given UE in accordance with the decision.

In this method, the first and second resource limitations may take various forms, but in general, the second resource limitation may be any limitation that allows a lesser extent of resources to be allocated than the first resource limitation for weaker RF conditions. In a preferred implementation, the first resource limitation may be a bit-rate limitation, such as a maximum allowable bit rate for the UE, and the second resource limitation may then be a resource-block limitation, such a maximum extent of resource blocks that can be allocated to the given UE (which could be defined based on the maximum allowable bit rate for the UE). But the resource limitations may take other forms as well.

Further, the act of allocating resources for the given data transmission to the given UE in accordance with the decision may take various forms. In one implementation, if the base station's decision is to use a bit-rate limitation, this act may involve (i) selecting a MCS based on the indication of RF conditions, (ii) determining a particular bit-rate limitation that applies to the given data transmission, (iii) determining an extent of resource blocks that would be needed to achieve the particular bit-rate limitation, and (iv) attempting to allocate up to the determined extent of resource blocks for the given data transmission to the given UE. And if the base station's decision is to use a resource-block limitation, this act may involve (i) selecting a MCS based on the indication of RF conditions, (ii) determining a particular resource-block limitation that applies to the given data transmission, where the particular resource-block limitation comprises a maximum extent of resource blocks that can be allocated for the given data transmission, and (iii) attempting to allocate up to the maximum extent of resource blocks for the given data transmission to the given UE. This act may take other forms as well.

Further yet, the act of making the decision, based at least in part on the indication of RF conditions, of whether to use the first resource limitation or the second resource limitation for data transmission to the given UE may take various forms. In one implementation, this act may involve (i) deciding to use the first resource limitation if the indication of RF conditions exceeds a threshold level of RF conditions, but (ii) deciding to use the second resource limitation if the indication of RF conditions does not exceed the threshold level of RF conditions, where the second resource limitation allows a lesser extent of resources to be allocated than the first resource limitation when the indication of RF conditions does not exceed the threshold level of RF conditions. This act may take other forms as well.

In another respect, disclosed is a base station that includes (a) a transmitter configured to transmit over an air interface to UEs operating in a wireless coverage area of the base station and (b) a controller configured to carry out the base station functions disclosed herein.

In yet another respect, disclosed is a non-transitory computer readable medium having instructions stored thereon, where the instructions are executable by a processing unit to cause a base station to carry out the base station functions disclosed herein.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE. However, it will be understood that principles of the disclosure can extend to apply in other scenarios as well, such as with respect to other air-interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
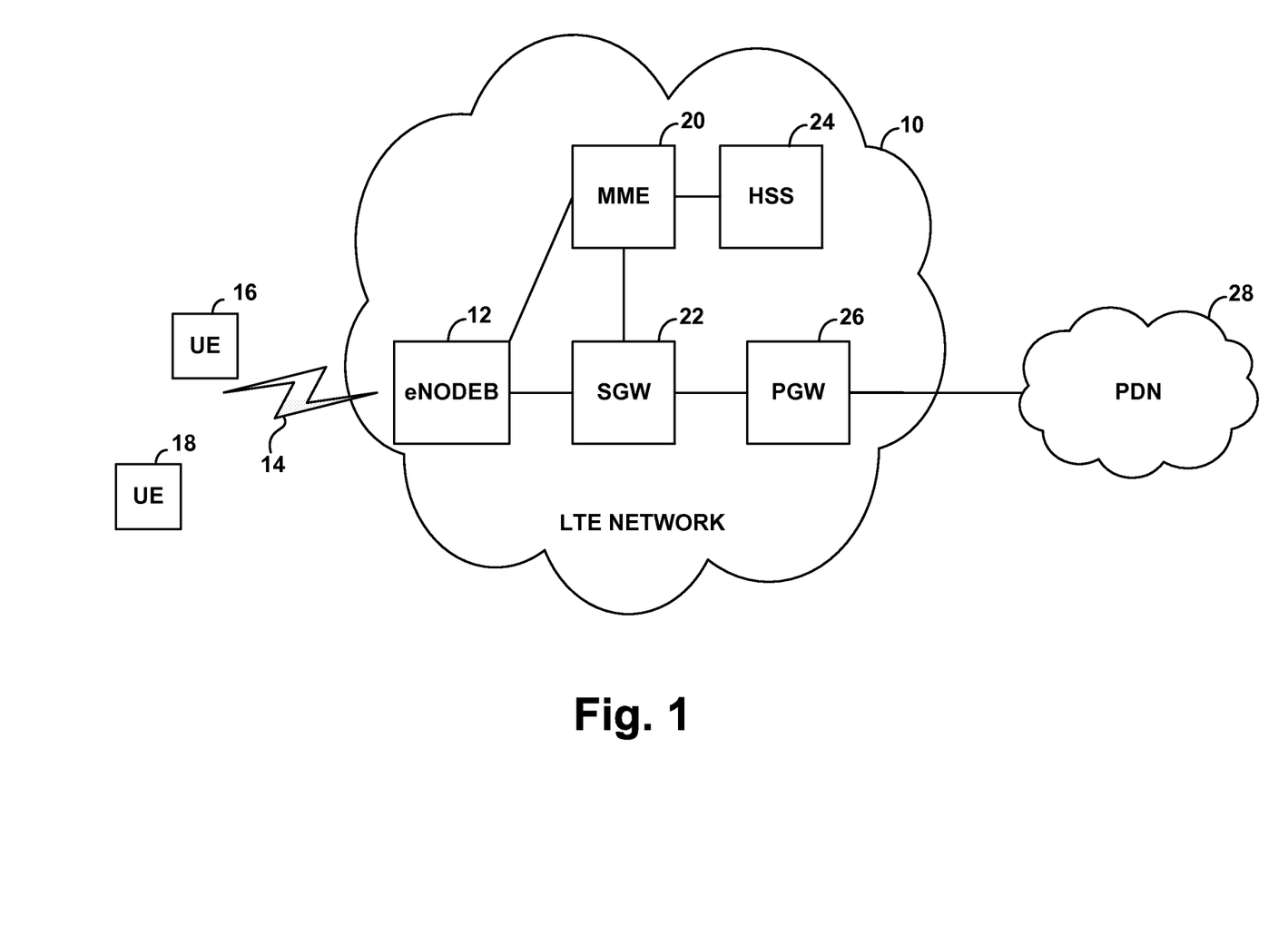
FIG. 1 is a simplified block diagram of a wireless communication system in which the disclosed method and system can be implemented.

Referring to the drawings, as noted above, FIG. 1 is a simplified block diagram of a wireless communication system in which the present method and system can be implemented. In particular, FIG. 1 depicts a representative LTE network 10, which functions primarily to serve UEs with wireless packet data communication service, including possibly voice-over-packet service, but may also provide other functions.

As shown, the LTE network includes an eNodeB 12, which has an antenna structure and associated equipment for providing an LTE coverage area 14 in which to serve UEs such as example UE 16 and example UE 18 as shown. eNodeB 12 then has a communication interface with a mobility management entity (MME) 20 and with a serving gateway (SGW) 22. MME 20 may generally function as a signaling controller for the LTE network, and may have a communication interface both with SGW 22 and with a home subscriber server (HSS) 24 that stores subscriber profiles for UEs registered with LTE network. SGW 22 may in turn have a communication interface with a PDN gateway (PGW) 26 that provides connectivity with at least one PDN 28. In practice, the illustrated components of the LTE network may sit as nodes on a private packet-switched network owned by an operator of the LTE network, and thus the various communication interfaces may be logical interfaces through that network.

With this arrangement as shown, UE 16 and UE 18 may both be attached (i.e., registered) with eNodeB 12 on a particular carrier, such as a particular carrier having a defined frequency bandwidth and structure as described above, and UE 16 and UE 18 may each have one or more established bearers for carrying bearer data between the UE and PDN 28. In such an arrangement, eNodeB 12 may at times receive, from SGW 22 or another source, data that is destined to one of the UEs, and the eNodeB may buffer that data for transmission to the UE. eNodeB 12 may then allocate downlink resource blocks to carry that data to the UE in a particular TTI.

Figure 2A:
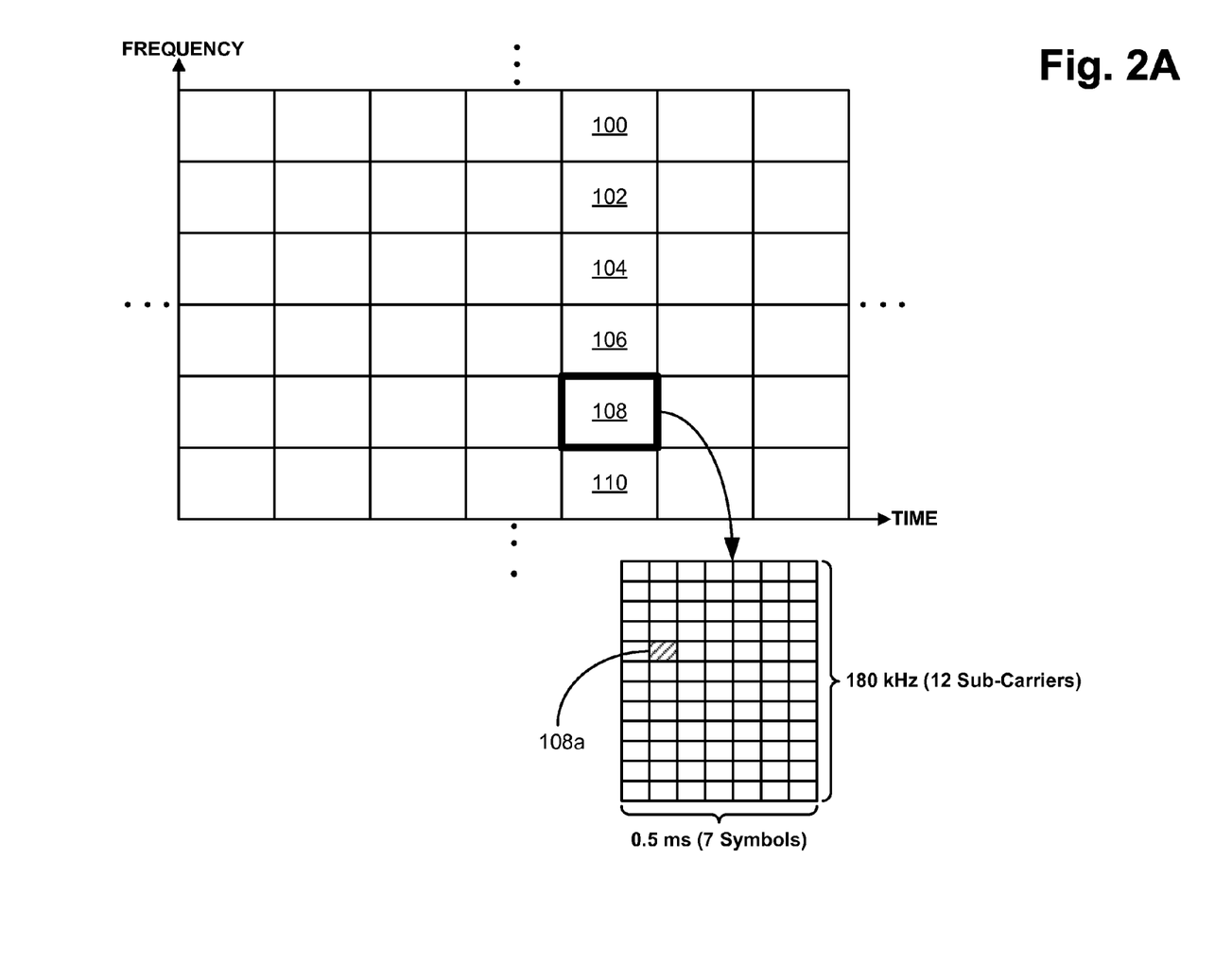
FIG. 2A is an illustration of a division of a shared downlink channel into downlink resource blocks, in accordance with an example embodiment.

FIG. 2A illustrates how the downlink resources in the eNodeB's coverage area 14 may be divided in time and frequency domains into resource blocks under LTE. In line with the discussion above, FIG. 2A shows an LTE downlink that is divided in the frequency domain into respective 180 kHz ranges of frequency bandwidth and in the time domain into 1 ms TTIs that each consist of two 0.5 ms timeslots. Each respective 180 kHz range of frequency in a respective TTI slot then comprises a different resource block. By way of example, FIG. 2A shows six resource blocks 100-110 for a particular TTI slot. It should be understood, however, that although FIG. 2A shows six resource blocks in each TTI slot, a base station's downlink could have a greater number of resource blocks in each TTI slot depending on the downlink's channel bandwidth, as indicated by the dots above and below resource blocks 100-110. For instance, Table I below illustrates the number of resource blocks per TTI slot that may be included for various different downlink bandwidths.

TABLE I

| Channel Bandwidth | # of RBs Per TTI Slot |
|---|---|
| 3 MHz | 15 |
| 5 MHz | 25 |
| 10 MHz | 50 |
| 15 MHz | 75 |
| 20 MHz | 100 |

FIG. 2A also includes a more detailed view of downlink resource block 108. As shown, in the frequency domain, the resource block's 180 kHz of frequency bandwidth comprises 12 sub-carriers that each have a bandwidth of 15 kHz. And in the time domain, the resource block may include a number of time segments that each correspond to the duration of an OFDM symbol. For instance, the resource block 108 is shown as having time segments for 7 OFDM symbols, although the number of OFDM symbols in a downlink resource block can vary. The group of 12 sub-carriers in each respective time segment may then be modulated together to form a respective OFDM symbol that is then transmitted on the downlink.

Each respective sub-carrier in each respective time segment may then be considered a resource element, which is generally the smallest defined unit of the LTE downlink. For instance, the detailed view of FIG. 2A shows that the resource block 108 may comprise a total of 84 resource elements, such as representative resource element 108a. Each of the resource elements can then be modulated to carry a certain number of bits, with that number depending on the particular MCS that is used for the data transmission.

Figure 2B:
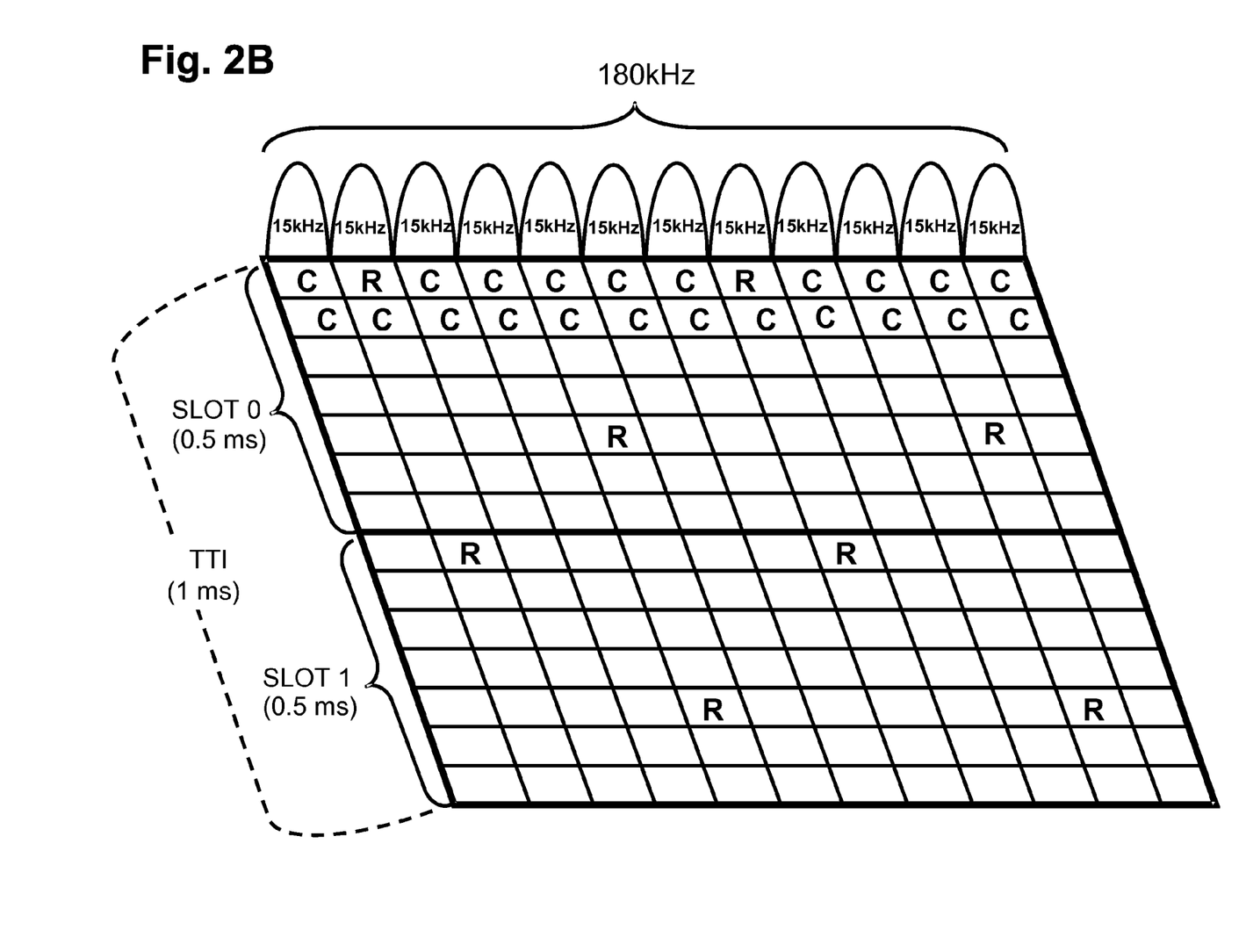
FIG. 2B is an illustration of a pair of downlink resource blocks, in accordance with an example embodiment.

Different resource elements in a downlink resource block may also be used for different purposes. FIG. 2B illustrates different functions among the resource elements in two successive resource blocks of an example LTE downlink. In this example, certain of the resource elements are labeled "R" to indicate that they are reserved for reference signals used for channel estimation. In addition, certain of the resource elements in the first two OFDM symbols are labeled "C" to indicate that they are used to transmit control signaling (e.g., the PCFICH, PDCCH, and PHICH channels). The other resource elements that are unlabeled can be used to transmit user data (e.g., the PDSCH channel). It is to be understood that FIG. 2B illustrates only one possible configuration, and that a downlink resource block could have various other configurations as well.

Referring again to FIG. 1, when eNodeB 12 has data to transmit to a UE, such as UE 16 or UE 18, the eNodeB may be configured to allocate downlink resource blocks in a particular TTI to carry the data to the UE. And in line with the discussion above, as part of this process, eNodeB 12 may take into account various factors, including the RF conditions being perceived by the UE, the corresponding MCS to be used for the data transmission, any applicable bit-rate limitations for the data transmission.

For instance, prior to allocating the resource blocks for the data transmission to the UE, eNodeB 12 may periodically receive a CQI from the UE, which is an index that reflects the signal-to-noise ratio measured by the UE on the downlink. The CQI indices for downlink RF conditions range from 0 to 15, with lower indices reflecting weaker RF conditions and higher indices reflecting stronger RF conditions. Thus, in the example arrangement depicted in FIG. 1, eNodeB 12 may generally receive higher CQIs from the example UE 16, which is located closer to eNodeB 12 and is likely perceiving stronger RF conditions, while eNodeB 12 may generally receive lower CQIs from the example UE 18, which is located further from eNodeB 12 and is likely perceiving weaker RF conditions (e.g., due to weaker signal strength from eNodeB 12 and/or interface from other eNodeBs).

Each time eNodeB 12 receives a new CQI from the UE, eNodeB 12 may store this CQI for future use. Then, when eNodeB 12 is ready to transmit data to the UE, eNodeB 12 may select a particular MCS for the data transmission based on the last CQI received from the UE (or perhaps based on the last few CQIs received from the UE). For instance, in LTE, each different CQI index may directly correspond to a different MCS (which is a particular combination of modulation type and coding rate), with lower CQIs corresponding to lower-order MCSs and higher CQIs corresponding to higher-order MCSs. Further, as noted above, each different MCS in turn corresponds to a different number of bits per resource element of the resource blocks used to carry out the data transmission, with lower-order MCSs corresponding to less data per resource element and higher-order MCSs corresponding to more data per resource element. Table II below depicts one possible example of the relationship between CQI indices, MCSs, and bits per resource element:

TABLE II

| CQI index | Modulation | Code Rate | Bits per Resource Element |
|---|---|---|---|
| 0 | | Out of Range | |
| 1 | QPSK | 78/2014 (≈0.076) | 0.1523 |

TABLE II-continued

| CQI index | Modulation | Code Rate | Bits per Resource Element |
|---|---|---|---|
| 2 | QPSK | 120/2014 (≈0.12) | 0.2344 |
| 3 | QPSK | 193/2014 (≈0.19) | 0.3770 |
| 4 | QPSK | 308/2014 (≈0.30) | 0.6016 |
| 5 | QPSK | 449/2014 (≈0.44) | 0.8770 |
| 6 | QPSK | 602/2014 (≈0.59) | 1.1758 |
| 7 | 16QAM | 378/2014 (≈0.37) | 1.4766 |
| 8 | 16QAM | 490/2014 (≈0.48) | 1.9141 |
| 9 | 16QAM | 616/2014 (≈0.60) | 2.4063 |
| 10 | 64QAM | 466/2014 (≈0.45) | 2.7305 |
| 11 | 64QAM | 567/2014 (≈0.55) | 3.3223 |
| 12 | 64QAM | 666/2014 (≈0.65) | 3.9023 |
| 13 | 64QAM | 772/2014 (≈0.75) | 4.5234 |
| 14 | 64QAM | 873/2014 (≈0.85) | 5.1152 |
| 15 | 64QAM | 948/2014 (≈0.93) | 5.5547 |

Thus, in practice, eNodeB 12 may use the last CQI received from the UE and a table such as the one above to select the MCS for the data transmission, which in turn defines the number of bits per resource element that can be included in each resource block allocated for the data transmission. For example, if UE 16 last reported a CQI index of 12, eNodeB 12 may then select a MCS that uses 64QAM modulation and a code rate of approximately 0.65, which results in each resource block having 3.9023 bits per resource element. Assuming that each resource block has up to 80 resource elements that are used to carry user data (i.e., 4 of the resource elements are used for reference symbols), this means that eNodeB 12 would be able to deliver up to 312 data bits per resource block allocated for a data transmission to UE 16. As another example, if UE 18 last reported a CQI index of 3, eNodeB 12 may then select a MCS that uses QPSK modulation and a code rate of approximately 0.19, which results in each resource block having 0.377 bits per resource element. Assuming, as before, that each resource block has up to 80 resource elements that are used to carry user data, this means that eNodeB 12 would be able to deliver up to 30 data bits per resource block allocated for a data transmission to UE 18.

As noted above, after selecting the MCS for the data transmission based on the last CQI received from the UE, the eNodeB may then identify any applicable bit-rate limitation for the data transmission to the UE. For instance, a service provider may assign each LTE subscriber a set of AMBR values, which generally define a maximum aggregate bit rate that that the LTE subscriber is allowed to receive when accessing non-GBR services. This set of AMBR values may include a Subscribed UE-AMBR value, which defines the maximum bit rate that the LTE subscriber's UE is allowed to receive across all of the UE's established non-GBR bearers, as well a respective APN-AMBR value for each PDN to which the UE may connect, which defines the maximum bit rate that the UE is allowed to receive from that PDN across all of the UE's non-GBR bearers (regardless of the number of connections with the PDN). These AMBR values are typically stored at HSS 24 in the LTE subscriber's profile.

In practice, when the LTE subscriber's UE attaches to the LTE network, MME 22 may obtain the subscriber's AMBR values from HSS 24. Thereafter, when the UE connects over a non-GBR bearer to a given PDN, such as PDN 28, the MME may provide the LTE subscriber's APN-AMBR value for PDN 28 to both PGW 26 and to the UE. At that time, the MME may also calculate and provide eNodeB 12 with a Used UE-AMBR value for the UE, which defines the actual maximum aggregate bit rate that the UE is allowed to receive across its non-GBR bearers at any given time depending on the UE's current PDN connections. For instance, if the UE's Subscribed UE-AMBR value is 10 Mbps and its APN-AMBR value for PDN 28 is 5 Mbps, then after the UE connects to PDN 28, the MME will calculate and provide eNodeB 12 with a Used UE-AMBR of 5 Mbps. This Used UE-AMBR value may then be increased if the UE later connects over non-GBR bearers to additional PDNs (e.g., if the UE connects to an additional PDN with APN-AMBR of 5 Mbps, the Used UE-AMBR may be increased to 10 Mbps), but the UE's Used UE-AMBR can never exceed the UE's Subscribed UE-AMBR value. The eNodeB may thus identify and use this Used UE-AMBR value as the maximum allowable bit rate when allocating resource blocks for non-GBR transmissions to the UE.

In addition to the AMBR values for non-GBR services, the service provider may also assign bit-rate limitations for GBR services to certain LTE subscribers. For instance, an LTE subscriber may be assigned both an MBR value, which generally defines the maximum bit rate that the UE is allowed to receive on a GBR bearer, and a GBR value, which generally defines the minimum bit rate that the subscriber's UE is required to receive on a GBR bearer. Similar to the LTE subscriber's AMBR values, these MBR and GBR values may be stored in the LTE subscriber's profile at HSS 24, and may be identified and used by eNodeB 12 when allocating resource blocks for GBR transmissions to the UE.

If eNodeB 12 identifies a maximum allowable bit rate that applies to the data transmission to the UE, such as a Used UE-AMBR value, eNodeB 12 may then apply that maximum allowable bit rate when allocating the resource blocks for the data transmission to the UE. In practice, this may involve the eNodeB determining the number of resource blocks that would need to be allocated in a particular TTI in order to achieve that maximum allowable bit rate. The eNodeB may carry out this determination in various manners, but in general, the number of resource blocks will be calculated based on the maximum allowable bit rate, the number of bits that can be included in each resource block for the selected MCS, and the duration of the TTI. For instance, according to one possible algorithm, the eNodeB may (a) use the maximum allowable bit rate and the TTI duration to determine the total number of bits per TTI needed to achieve that bit rate and then (b) use that total number of bits and the number of bits per resource block to determine the number of resource blocks needed to carry that number of bits. Once the eNodeB determines this number of resource blocks, the eNodeB may then attempt to allocate up to this number of resource blocks for the data transmission in the next available TTI.

In line with the discussion above, it is therefore apparent that when the eNode 12 uses a bit-rate limitation for the data transmission to the UE, the extent of resource blocks that eNodeB 12 may allocate for that data transmission varies based on the RF conditions being detected by that UE. For instance, in the example arrangement depicted in FIG. 1, assume that UE 16 and UE 18 both have an example Used UE-AMBR of 5 Mbps. If eNodeB 12 applies this bit-rate limitation for a data transmission to UE 16, which is reporting a CQI index of 12 and is thus capable of receiving an MCS that provides up to 312 data bits per resource block, eNodeB 12 may only need to use 8 resource blocks in a given TTI. However, if eNodeB 12 applies this same bit-rate limitation for a data transmission to UE 18, which is only reporting a CQI of 3 and is thus only capable of receiving a MCS that provides up to 30 data bits per resource block, eNodeB 12 would need to use 84 resource blocks in a given TTI.

As noted above, the eNodeB could also employ a similar process when allocating uplink resource blocks for data transmissions from a UE. For instance, when the eNodeB becomes aware that a UE has data to transmit to the LTE network over the uplink, the eNodeB may use the UE's last-reported CQI index and a bit-rate limitation (e.g., an uplink Used UE-AMBR value) to determine an extent of resource blocks to allocate on the uplink for the data transmission. As a result, the extent of resource blocks allocated for an uplink data transmission will also vary depending on CQI index, with higher CQI indices generally corresponding to the allocation of a lesser extent of uplink resource blocks and lower CQI indices generally corresponding to the allocation of a greater extent of uplink resource blocks.

Thus, as currently configured, an eNodeB could end up allocating a disproportionate share of resource blocks to UEs such as UE 18 that are in weaker RF conditions, which may ultimately inhibit the eNodeB's ability to adequately serve UEs such as UE 16 that are in stronger RF conditions. Disclosed herein are functions that help to address this issue.

Figure 3:
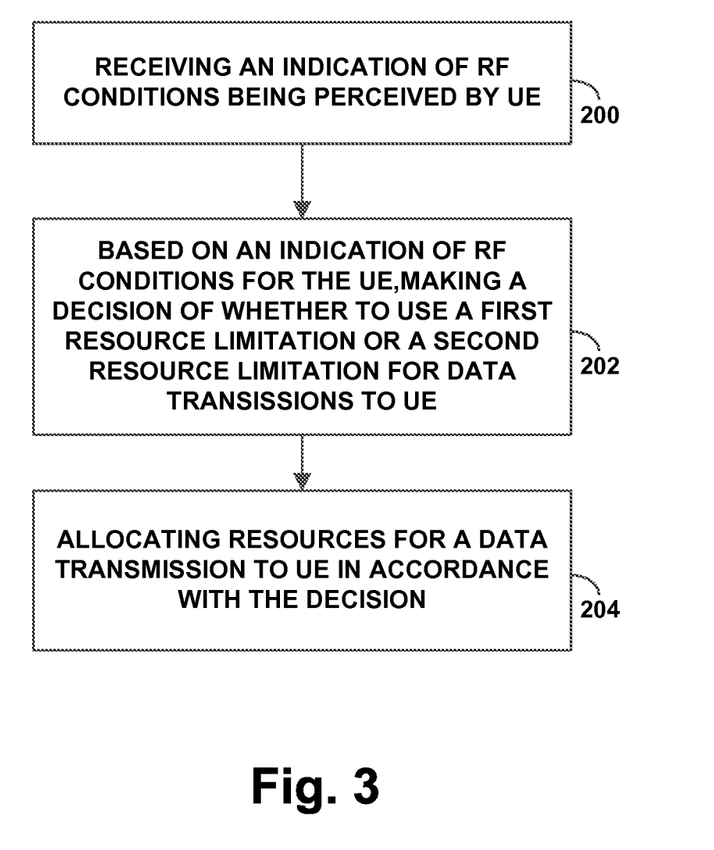
FIG. 3 is a flow chart depicting example functions that can be carried out in accordance with the disclosure.

FIG. 3 is next a flow chart depicting functions that can be carried out by a base station such as eNodeB 12 in accordance with the present disclosure. For purposes of illustration only, these functions are described below in the context of a base station allocating resource blocks for data transmissions on an LTE downlink. It should be understood, however, that the functions may be applied to other scenarios as well, including the allocation of resource blocks on an LTE uplink and/or the allocation of shared resources on a downlink or uplink configured according to another protocol. It should also be understood that other entities in a wireless communication system (e.g., a controller) may assist in carrying out at least some of these functions.

As shown in FIG. 3, at block 200, a representative method may begin with the base station receiving an indication of RF conditions being perceived by a given UE that is operating in the base station's coverage area, such as UE 16 or UE 18. This indication of RF conditions for the UE may take various forms. In line with the discussion above, for instance, the indication of RF conditions for the UE may be a CQI index, which reflects a signal-to-noise ratio measured by the given UE on the base station's downlink. Additionally or alternatively, the indication of RF conditions for the UE may be some other measure of signal quality, signal strength, and/or signal power detected by the UE on the base station's downlink, examples of which may include a reference signal receive quality (RSRQ), a reference signal receive power (RSRP), and/or a received signal strength indicator (RSSI). The indication of RF conditions for the UE may take various other forms as well.

The act of receiving the indication of RF conditions for the UE may also take various forms. In one example, the base station may receive the indication of RF conditions from the UE without prompting by the base station (e.g., the UE may send the indication periodically according to a schedule, non-periodically in conjunction with uplink bearer data, etc.). In another example, the base station may be configured to request a report of RF conditions for the UE at certain times, and the base station may then receive the indication of RF conditions in response to this request. In either case, in practice, the base station may receive the indication of RF conditions from the UE over an uplink channel. However, the base station could also receive the indication of RF conditions perceived by the UE from other sources (e.g., other network entities) and/or in other manners as well.

After receiving the indication of RF conditions for the UE, the base station may store the received indication of RF conditions for future use. Additionally or alternatively, the base station could use the received indication as a basis to generate and/or update some other indication of RF conditions for the UE. For example, in some implementations, the base station may be configured to generate and maintain a value that represents an aggregation (e.g., an average) of the last few indications of RF conditions for the UE that were received by the base station, in which case the base station may update that value based on the last received indication of RF conditions for the UE. Other examples are possible as well.

At block 202, based on an indication of RF conditions for the UE (e.g., the last received indication of RF conditions or some other indication of RF conditions that was determined based on the last received indication), the base station may then make a decision of whether to use a first resource limitation or a second resource limitation for data transmissions to the UE, where the second resource limitation generally allows a lesser extent of resources to be allocated than the first resource limitation for weaker RF conditions.

The first and second resource limitations may take various forms. In a preferred implementation, the first resource limitation may take the form of a bit-rate limitation for data transmissions to the UE. For instance, in line with the discussion above, the bit-rate limitation may be a maximum bit rate that the UE is generally allowed to receive for a given data transmission, such as a Used UE-AMBR value for a non-GBR data transmission, a MBR value for a GBR data transmission, or the like. However, the bit-rate limitation may take various other forms as well, including the possibility that the bit-rate limitation could vary based on parameters associated with the UE (e.g. RF conditions perceived by the UE).

In practice, a bit-rate limitation such as this does impose some limitation on the extent of resources that may be allocated for data transmissions to the UE. However, as noted above, this limitation varies based on the RF conditions being perceived by the UE, thereby allowing a greater extent of resources to be allocated as RF conditions become weaker. At a certain level of RF conditions, it may then become desirable to use an alternative resource limitation that imposes a greater restriction on the extent of resources that can be allocated for a data transmission to the UE.

The second resource limitation may thus take the form of any resource limitation that allows a lesser extent of resources to be allocated than the first resource limitation for weaker RF conditions (e.g., CQIs less than 7). In a preferred implementation, this second resource limitation may be a resource-block limitation, which may take various forms.

For instance, in one embodiment, the resource-block limitation may be a parameter that varies depending on certain parameters associated with the UE, such as the maximum allowable bit rate for the UE and/or the RF conditions for the UE. By way of example, the resource-block limitation could be defined as the extent of resource blocks needed to achieve a given maximum allowable bit rate under representative mid-level RF conditions (e.g., a CQI index of 7), in which case the resource-block limitation would vary based on the maximum allowable bit rate for the UE. For instance, with reference to the values in Table II above (and applying a mid-level CQI index of 7), the resource-block limitation may be 22 resource blocks per TTI for a maximum allowable bit rate of 5 Mbps, 43 resource blocks for a maximum allowable bit rate of 10 Mbps, and so on. In this embodiment, the variable resource-block limitation may thus be expressed as an algorithm, a table, or the like that enables the base station to determine the particular resource-limitation to use for a given UE.

In another embodiment, the resource-block limitation may simply be a maximum extent of resource blocks that the base station is allowed allocated for any given data transmission on the base station's downlink, independent of any parameters associated with the transmission or the receiving UE. In this embodiment, the resource-block limitation may take the form a single fixed parameter that may be selected by a service provider based on parameters such as channel bandwidth, network usage, etc., and the resource-block limitation and may be expressed in terms of a number of resource blocks per TTI, a percentage of resource blocks per TTI, or the like. The resource-block limitation could take other forms as well.

While the preferred implementation uses a bit-rate limitation for the first resource limitation and a resource-block limitation for the second resource limitation, it should be understood that the first and second resource limitations could take other forms as well. For instance, instead of a resource-block limitation, the second resource limitation could take the form of a second bit-rate limitation that is lower than the first bit-rate limitation (e.g., a given percentage of the first bit-rate limitation), as such a second resource limitation may still allow a lesser extent of resources to be allocated than the first resource limitation for weaker RF conditions. Other implementations are possible as well.

It should be also be understood that when applying the disclosed method to GBR data transmissions, the second resource limitation must still permit allocation of enough resource blocks to achieve the minimum required bit rate for GBR data transmissions. In this respect, the second resource limitation may also vary depending on whether the particular data transmission at issue is a non-GBR transmission or a GBR transmission. More generally, as with the first resource limitation, the second resource limitation may differ depending on the type of data transmission to which the limitation is applied.

The act of deciding between the first and second resource limitations may also take various forms. In one implementation, this act may involve comparing the indication of RF conditions to a threshold level of RF conditions and then making the decision based on that comparison. For instance, in a preferred implementation, the base station may be configured to (a) use a bit-rate limitation if the indication of RF conditions exceeds the threshold level (thereby indicating relatively strong RF conditions) and (b) use a resource-block limitation if the indication of RF conditions does not exceed the threshold level (thereby indicating relatively weak RF conditions).

This threshold level of RF conditions may take various forms, and may generally be set to a level of RF conditions at which the first resource limitation begins to allow an undesirable extent of resource blocks to be allocated for a given data transmission. In this respect, the threshold level may be a fixed parameter (e.g., a CQI of 7), or may be a variable parameter that is defined based on parameters associated with the UE (e.g., the maximum allowable bit rate). For instance, in the embodiment described above where the resource-block limitation is a variable parameter that is defined using representative mid-level RF conditions, the threshold level of RF conditions will preferably be the same as the representative mid-level RF conditions, as this may allow for a smooth transition between the bit-rate limitation and the resource-block limitation. Indeed, by using the same value, the extent of resource blocks that can be allocated at the threshold level of RF conditions—which is the level at which the bit-rate limitation may allow the greatest extent of resource blocks to be allocated—may be equivalent to the resource-block limitation. In this way, the resource-block limitation may effectively function as a cap on the extent of resource blocks that can be allocated once the RF conditions reach the threshold level.

The base station may decide between the resource limitations in other manners as well. Further, the base station may be configured to make this decision at various times.

According to one implementation, the base station may be configured to decide which resource limitation to use in response to the base station receiving an indication of RF conditions for the UE. In this implementation, the base station may then preferably be configured to maintain an indication of the base station's decision for future use, because the base station may receive indications of RF conditions for the UE at times when it does not have data to send to the UE and is thus not yet in a position to apply the base station's decision. For example, the base station may be configured to maintain a data bit for each respective UE in the base station's coverage area, with this data bit having a first value when the base station's decision is to use the first resource limitation for data transmissions to a UE and having a second value when the base station's decision is to use the second resource limitation for data transmissions to the UE. Once the base station has data to transmit to the UE, the base station may then be configured to reference the data bit for the UE in order to know which resource limitation to apply to the data transmission.

According to another implementation, the base station may be configured to decide which resource limitation to use in response to determining that the RF conditions being perceived by the UE have changed. For instance, in response to receiving an indication of RF conditions for the UE, the base station may be configured to first determine whether the received indication of RF conditions differs from the indication of RF conditions that the base station is currently maintaining for the UE, and then to update its decision of which resource limitation to use only if the received indication does differ from the currently-maintained indication. In this implementation, as above, the base station may then preferably be configured to maintain an indication of the base station's decision for future use, because the base station may identify a change in RF conditions for the UE at times when the base station does not have data to send to the UE and is thus not yet in a position to apply the base station's decision.

According to yet another implementation, the base station may be configured to decide which resource limitation to use in response to detecting that the base station has data to transmit to the UE. For instance, upon detecting new data for transmission to the UE, the base station may obtain an indication of RF conditions for the UE (e.g., by accessing a stored indication that was previously received or determined by the base station) and then decide which resource limitation to use for the data transmission based on that indication. In this implementation, the base station could also again be configured to maintain an indication of the base station's decision, but because the base station would be making the decision at times when it has data to transmit to the UE, the base station would be capable of applying the base station's decision without referencing such an indication.

It should be understood that the implementations describe above could also be combined, such that the base station may be configured to make its decision between the bit-rate limitation and the resource limitation in response to both receiving indicators of RF conditions for the UE and detecting new data for transmission to the UE. And the base station could be configured to make this decision at other times and/or in response to other triggering events as well.

At step 204, after making the decision of which resource limitation to use for data transmissions to the UE (and potentially updating an indicator of that decision), the base station may then allocate resources for a data transmission to the UE in accordance with the decision. For instance, if the base station's decision is to use the first resource limitation for data transmissions to the UE, the base station may then apply the first resource limitation when allocating resources for the data transmission to the UE. Alternatively, if the base station's decision is to use the second resource limitation for data transmissions to the UE, the base station may then apply the first resource limitation when allocating resources for the data transmission to the UE. As noted above, in a preferred implementation, the first resource limitation may be a bit-rate limitation and the second resource limitation may be a resource-block limitation (but these resource limitations may take other forms as well).

The act of allocating resources for a data transmission to the UE in accordance with a decision to use a bit-rate limitation may take various forms. For instance, in line with the discussion above, the base station may first select the MCS (e.g., based on the last CQI received from the UE) and identify the particular bit-rate limitation to be used for the data transmission (e.g., the last-received Used UE-AMBR). In turn, the base station may determine an extent of resource blocks that would be needed to achieve the particular bit-rate limitation when using the selected MCS. Finally, the base station may attempt to allocate up to the determined extent of resource blocks for the data transmission. However, it should be understood that, for various reasons, the base station might not end up allocating the full extent of resource blocks permitted under the bit-rate limitation.

The act of allocating resources for a data transmission to the UE in accordance with a decision to use a resource-block limitation may also take various forms. To begin, the base station may select the MCS and determine the particular resource-block limitation to be used for the data transmission to the UE. In the embodiment discussed above where the resource-block limitation varies based on parameters associated with the UE (e.g., maximum allowable bit rate), the base station may perform this determination based on an algorithm, a table, or the like that defines a relationship between the resource-block limitation and the parameters associated with the UE. Or in the embodiment where the resource-block limitation is a fixed parameter that is independent of parameters associated with the UE, the base station may perform the determination by simply accessing this fixed parameter. The act of determining the particular resource-block limitation may take other forms as well. Once the base station selects the MCS and determines the particular resource-block limitation to be used for the data transmission, the base station may then attempt to allocate up to that limited extent of resource blocks for the data transmission (with any additional data being sent in later TTIs). However, it should be understood, that for various reasons, the base station might not end up allocating the full extent of resource blocks permitted under the resource-block limitation.

The act of allocating resources for the data transmission in accordance with the resource limitations may take various other forms as well, including the possibility that some of the functions described above may be rearranged, modified, and/or removed, as well as the possibility that other functions may be added.

Finally, after allocating the resources for the data transmission to the UE in accordance with the decision, the base station may carry out the data transmission to the UE using the allocated resources. For instance, in line with the discussion above, the base station may modulate the data into ODFM symbols and then transmit these ODFM symbols in the allocated resource blocks of the downlink.

Thus, in accordance with the present disclosure, the base station may be capable of limiting the extent of resources allocated to UEs in weaker RF conditions. For instance, in the example arrangement depicted in FIG. 1, eNodeB 12 may receive an indication that UE 16 is perceiving threshold strong RF conditions and that UE 18 is perceiving threshold weak RF conditions. Based on these indications, eNodeB 12 may decide to use a bit-rate limitation for data transmissions to UE 16, because the stronger RF conditions may enable the eNodeB to provide this bit-rate limitation to UE 16 using a reasonable extent of resources. On the other hand, eNodeB 12 may decide to use a resource-block limitation for data transmissions to UE 18, because in weaker RF conditions, the resource-block may allow a more reasonable extent of resource blocks to be allocated for the data transmission to UE 18 than the bit-rate limitation. For example, assume that UE 18 has a maximum allowable bit rate of 5 Mbps and is reporting a CQI of 3. If eNodeB 12 used the bit-rate limitation, the eNodeB may allow up to 84 resource blocks per TTI to be allocated for data transmissions to UE 18. But by instead using the resource-block limitation, eNodeB 12 may allow only up to 22 resource blocks per TTI to be allocated for data transmissions to UE 18 (assuming the resource-block limitation is defined as the extent of resource blocks needed to achieve a 5 Mbps bit rate at a CQI index of 7).

Figure 4:
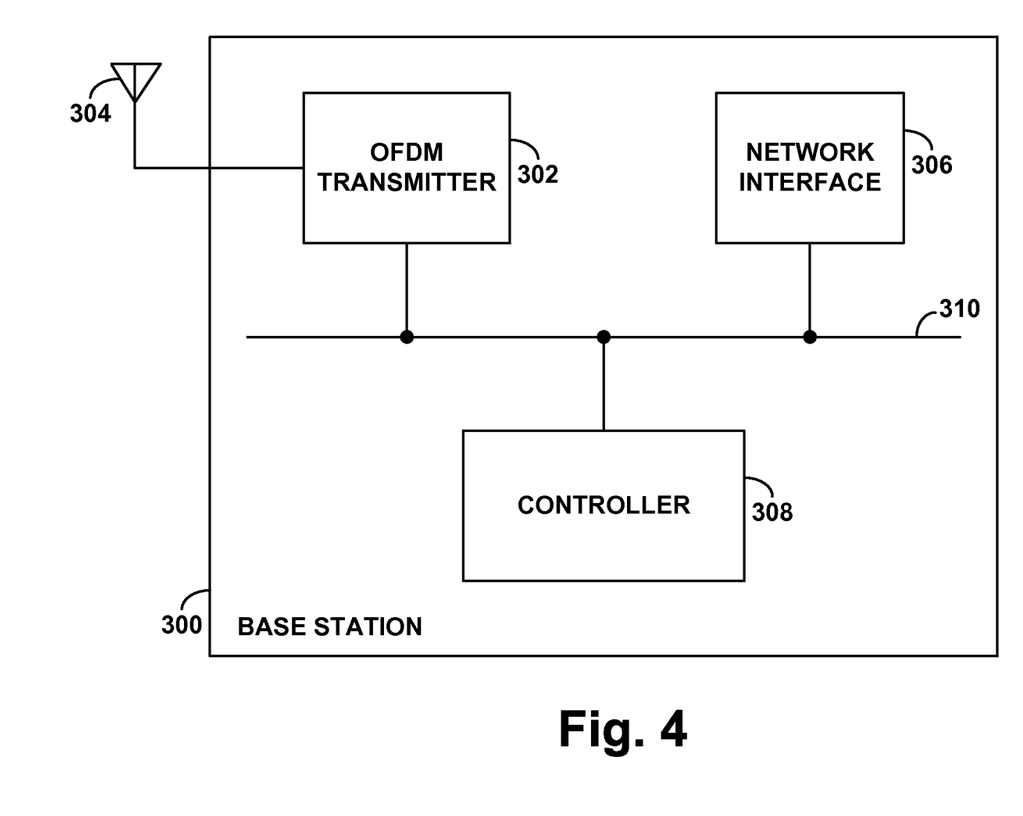
FIG. 4 is a simplified block diagram of an example base station operable in accordance with the disclosure.

FIG. 4 is a simplified block diagram of an example base station 300. Base station 300 could, for example, be part of a communication system as shown in FIG. 1 and correspond to eNodeB 12. As shown in FIG. 4, base station 300 includes an OFDM transmitter 302 and associated antenna structure 304, as well as a network interface 306, and a controller 308, with various ones of these or other components being communicatively linked together by a system bus, network, or other connection mechanism 310.

OFDM transmitter 302 and antenna structure 304 may function in combination to provide an OFDM downlink as described above. As such, the OFDM transmitter 302 is configured to receive data, generate OFDM symbols from the data, and transmit the OFDM symbols on the downlink. Network interface 306 may then comprise a wired and/or wireless network communication interface (such as an Ethernet interface) through which the base station may receive data over a backhaul connection that connects base station 300 to one or more entities of a wireless network, such as an SGW for instance, for transmission of the data to one or more UEs served by the base station.

Controller 308 in base station 300 may control the transmission of data, including control and user data, on the downlink. For example, controller 308 may allocate downlink resource blocks to UEs and may control transmission by OFDM transmitter 302 accordingly. Further, controller 308 may be configured to carry out the functions described above. For instance, the controller 308 may be configured to receive and process indications of RF conditions perceived by a UE, decide between different resource limitations based on an indication of RF conditions perceived by the UE, and then allocate resources for a data transmission with the UE in accordance with the decision.

Controller 308 could be implemented using hardware, software, and/or firmware. For example, controller 308 could include one or more processors and a non-transitory computer readable medium (e.g., volatile and/or non-volatile memory) that stores executable instructions. The executable instructions, when executed by the one or more processors, may cause controller 308 (and thus base station 300) to perform any of the base station functions described herein.

Exemplary embodiments have been described above. Those skilled in the art will understand, however, that changes and modifications may be made to these embodiments without departing from the true scope and spirit of the invention.

We claim:

1. A method comprising:
   a base station making a decision, based at least in part on an indication of radio frequency (RF) conditions being perceived by a given user equipment device (UE), of whether to use a bit-rate limitation or rather a resource-block limitation for data transmissions with the given UE; and
   the base station thereafter allocating resources for a given data transmission with the given UE in accordance with the decision,
   wherein the bit-rate limitation comprises a maximum allowable bit-rate for the given UE and the second resource limitation comprises a maximum extent of resource-blocks that can be allocated to the given UE, and
   wherein making the decision comprises (i) if the indication of RF conditions exceeds a threshold level of RF conditions, deciding to use the bit-rate limitation, but (ii) if the indication of RF conditions does not exceed the threshold level of RF conditions, deciding to use the resource-block limitation, wherein the resource-block limitation allows a lesser extent of resources to be allocated than the bit-rate limitation when the indication of RF conditions does not exceed the threshold level of RF conditions.

2. The method of claim 1, wherein the maximum extent of resource blocks is defined based on the maximum allowable bit rate for the given UE.

3. The method of claim 1, wherein making the decision, based at least in part on the indication of RF conditions, of whether to use the bit-rate limitation or the resource-block limitation for data transmission to the given UE comprises making a decision to use the bit-rate limitation, and
   wherein allocating resources for the given data transmission to the given UE in accordance with the decision to use the bit-rate limitation comprises:
   (i) selecting a modulation and coding scheme (MCS) based on the indication of RF conditions,
   (ii) determining a particular bit-rate limitation that applies to the given data transmission,
   (iii) determining an extent of resource blocks that would be needed to achieve the particular bit-rate limitation, and
   (iv) attempting to allocate up to the determined extent of resource blocks for the given data transmission to the given UE.

4. The method of claim 1, wherein making the decision, based at least in part on the indication of RF conditions, of whether to use the bit-rate limitation or the resource-block limitation for data transmission to the given UE comprises making a decision to use the resource-block limitation, and
wherein allocating resources for the given data transmission to the given UE in accordance with the decision to use the resource-block limitation comprises:
(i) selecting a modulation and coding scheme (MCS) based on the indication of RF conditions,
(ii) determining a particular resource-block limitation that applies to the given data transmission, wherein the particular resource-block limitation is a maximum extent of resource blocks that can be allocated for the given data transmission, and
(iii) attempting to allocate up to the maximum extent of resource blocks for the given data transmission to the given UE.

5. The method of claim 1, wherein the indication of RF conditions comprises an indication of RF conditions received from the given UE.

6. The method of claim 1, wherein the indication of RF condition comprises a channel quality indicator (CQI) index.

7. A base station comprising:
a transmitter configured to transmit over an air interface to user equipment devices (UEs) operating in a wireless coverage area of the base station, wherein the air interface defines a downlink that includes a plurality of discrete resources; and
a controller configured to (i) make a decision, based at least in part on an indication of radio frequency (RF) conditions being perceived by a given UE, of whether to use a bit-rate limitation or rather a resource-block limitation for data transmissions to the given UE and (ii) allocate resources for a given data transmission to the given UE in accordance with the decision,
wherein the bit-rate limitation comprises a maximum allowable bit-rate for the given UE and the resource-block limitation comprises a maximum extent of resource-blocks that can be allocated to the given UE, and
wherein making the decision comprises (i) if the indication of RF conditions exceeds a threshold level of RF conditions, deciding to use the bit-rate limitation, but (ii) if the indication of RF conditions does not exceed the threshold level of RF conditions, deciding to use the resource-block limitation, wherein the resource-block limitation allows a lesser extent of resources to be allocated than the bit-rate limitation when the indication of RF conditions does not exceed the threshold level of RF conditions.

8. The base station of claim 7, wherein the maximum extent of resource blocks is defined based on the maximum allowable bit rate for the given UE.

9. The base station of claim 7, wherein making the decision, based at least in part on the indication of RF conditions, of whether to use the bit-rate limitation or the resource-block limitation for data transmission to the given UE comprises making a decision to use the bit-rate limitation, and
wherein allocating resources for the given data transmission to the given UE in accordance with the decision to use the bit-rate limitation comprises:
(i) selecting a modulation and coding scheme (MCS) based on the indication of RF conditions,
(ii) determining a particular bit-rate limitation that applies to the given data transmission,
(iii) determining an extent of resource blocks that would be needed to achieve the particular bit-rate limitation, and
(iv) attempting to allocate up to the determined extent of resource blocks for the given data transmission to the given UE.

10. The base station of claim 7, wherein making the decision, based at least in part on the indication of RF conditions, of whether to use the bit-rate limitation or the resource-block limitation for data transmission to the given UE comprises making a decision to use the resource-block limitation, and
wherein allocating resources for the given data transmission to the given UE in accordance with the decision to use the resource-block limitation comprises:
(i) selecting a modulation and coding scheme (MCS) based on the indication of RF conditions,
(ii) determining a particular resource-block limitation that applies to the given data transmission, wherein the particular resource-block limitation is a maximum extent of resource blocks that can be allocated for the given data transmission, and
(iii) attempting to allocate up to the maximum extent of resource blocks for the given data transmission to the given UE.

11. The base station of claim 7, wherein the indication of RF conditions comprises an indication of RF conditions received from the given UE.

12. The base station of claim 7, wherein the indication of RF condition comprises a channel quality indicator (CQI) index.

13. A non-transitory computer readable medium having instructions stored thereon, wherein the instructions are executable by a processing unit to cause a base station to carry out the following functions:
making a decision, based at least in part on an indication of radio frequency (RF) conditions being perceived by a given user equipment device (UE), of whether to use a bit-rate limitation or rather a resource-block limitation for data transmissions with the given UE; and
thereafter allocating resources for a given data transmission with the given UE in accordance with the decision,
wherein the bit-rate resource limitation comprises a maximum allowable bit-rate for the given UE and the second resource limitation comprises a maximum extent of resource-blocks that can be allocated to the given UE, and
wherein making the decision comprises (i) if the indication of RF conditions exceeds a threshold level of RF conditions, deciding to use the bit-rate limitation, but (ii) if the indication of RF conditions does not exceed the threshold level of RF conditions, deciding to use the resource-block limitation, wherein the resource-block limitation allows a lesser extent of resources to be allocated than the bit-rate limitation when the indication of RF conditions does not exceed the threshold level of RF conditions.

* * * * *